(12) United States Patent
Wood et al.

(10) Patent No.: US 7,553,160 B2
(45) Date of Patent: *Jun. 30, 2009

(54) INTERACTIVE HAND HELD APPARATUS WITH STYLUS

(75) Inventors: Michael C. Wood, Orinda, CA (US); Alice Chen, Oakland, CA (US); David Goldstein, San Francisco, CA (US); Mark Flowers, Los Gatos, CA (US); Joseph B. Miller, III, San Ramon, CA (US); Michelle Fitts, Hayward, CA (US); Curtis Cole, Los Altos, CA (US); Rick Adolf, Sunnyvale, CA (US); Antonia Kohl, Oakland, CA (US); Carol Thies, San Rafael, CA (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 263 days.

This patent is subject to a terminal disclaimer.

(21) Appl. No.: 11/404,961

(22) Filed: Apr. 13, 2006

(65) Prior Publication Data

US 2006/0188861 A1 Aug. 24, 2006

Related U.S. Application Data

(63) Continuation of application No. 10/775,830, filed on Feb. 9, 2004, now Pat. No. 7,083,420.

(60) Provisional application No. 60/446,829, filed on Feb. 10, 2003, provisional application No. 60/512,326, filed on Oct. 17, 2003.

(51) Int. Cl.
*G09B 7/00* (2006.01)

(52) U.S. Cl. ...................... 434/322; 434/323

(58) Field of Classification Search ............ 434/307 R, 434/322, 323, 356, 357, 362; 463/36, 37, 463/38

See application file for complete search history.

(56) References Cited

U.S. PATENT DOCUMENTS

| 4,288,537 A | 9/1981 | Knetzger |
| 4,687,200 A | 8/1987 | Shirai |
| 4,932,904 A | 6/1990 | Ichitsubo |
| 4,969,647 A | 11/1990 | Mical et al. |
| 5,095,798 A | 3/1992 | Okada et al. |
| 5,134,391 A | 7/1992 | Okada |
| 5,137,457 A | 8/1992 | Howard et al. |

(Continued)

OTHER PUBLICATIONS

U.S. Appl. No. 10/776,012, Wood et al.

(Continued)

*Primary Examiner*—Kurt Fernstrom
(74) *Attorney, Agent, or Firm*—Townsend and Townsend and Crew LLP

(57) ABSTRACT

An interactive, handheld apparatus is provided. The apparatus includes a housing, a display screen on the housing, an electronic position location system, a stylus for selecting images on the display screen, a directional control pad on the housing and a memory device. The electronic position location system includes a processor that is capable of determining a location of a selected region of the display screen. The memory device includes computer code for an educational game and is operatively coupled to the processor.

20 Claims, 17 Drawing Sheets

U.S. PATENT DOCUMENTS

| | | | |
|---|---|---|---|
| 5,161,803 | A | 11/1992 | Ohara |
| 5,184,830 | A | 2/1993 | Okada et al. |
| 5,207,426 | A | 5/1993 | Inoue et al. |
| 5,213,327 | A | 5/1993 | Kitaue |
| 5,291,189 | A | 3/1994 | Otake et al. |
| 5,327,158 | A | 7/1994 | Takahashi et al. |
| 5,337,069 | A | 8/1994 | Otake et al. |
| 5,371,512 | A | 12/1994 | Otake et al. |
| 5,400,052 | A | 3/1995 | Otake et al. |
| 5,426,763 | A | 6/1995 | Okada |
| 5,477,510 | A | 12/1995 | Ukita |
| 5,483,257 | A | 1/1996 | Otake et al. |
| 5,485,176 | A | 1/1996 | Ohara et al. |
| 5,495,266 | A | 2/1996 | Otake et al. |
| 5,509,663 | A | 4/1996 | Otake et al. |
| 5,596,698 | A | 1/1997 | Morgan |
| 5,604,517 | A | 2/1997 | Filo |
| 5,608,424 | A | 3/1997 | Takahashi et al. |
| 5,636,995 | A | 6/1997 | Sharpe |
| 5,670,992 | A | 9/1997 | Yasuhara |
| 5,692,906 | A | 12/1997 | Corder |
| 5,708,457 | A | 1/1998 | Otake et al. |
| 5,730,602 | A | 3/1998 | Gierhart |
| 5,766,016 | A | 6/1998 | Sinclair et al. |
| 5,769,643 | A | 6/1998 | Stevens |
| 5,823,782 | A | 10/1998 | Marcus et al. |
| 5,855,483 | A | 1/1999 | Collins |
| 5,951,399 | A | 9/1999 | Burrell et al. |
| 5,961,333 | A | 10/1999 | Harrison et al. |
| 6,042,478 | A | 3/2000 | Ng |
| 6,049,813 | A | 4/2000 | Danielson et al. |
| 6,120,379 | A | 9/2000 | Tanaka et al. |
| 6,241,611 | B1 | 6/2001 | Takeda et al. |
| 6,266,685 | B1 | 7/2001 | Danielson et al. |
| 6,295,052 | B1 | 9/2001 | Kato et al. |
| 6,315,669 | B1 | 11/2001 | Okada et al. |
| 6,322,447 | B1 | 11/2001 | Okada et al. |
| 6,332,840 | B1 | 12/2001 | Nishiumi et al. |
| 6,356,443 | B2 | 3/2002 | Jenks et al. |
| 6,383,079 | B1 | 5/2002 | Takeda et al. |
| 6,419,584 | B1 | 7/2002 | Sakamoto et al. |
| 6,435,969 | B1 | 8/2002 | Tanaka et al. |
| 6,461,242 | B2 | 10/2002 | Takeda et al. |
| 6,464,503 | B1 | 10/2002 | Heit et al. |
| 6,494,786 | B2 | 12/2002 | Oshita |
| 6,506,119 | B1 | 1/2003 | Burrell et al. |
| 6,520,501 | B1 | 2/2003 | Naghi et al. |
| 6,608,616 | B2 | 8/2003 | Wood et al. |
| 6,726,485 | B2 | 4/2004 | Marcus et al. |
| 6,729,881 | B2 | 5/2004 | Marcus et al. |
| 6,739,874 | B2 | 5/2004 | Marcus et al. |
| 8,755,655 | | 6/2004 | Marcus et al. |
| 6,758,674 | B2 * | 7/2004 | Lee ............................ 434/155 |
| 7,006,788 | B1 | 2/2006 | Marcus et al. |
| 7,016,213 | B2 | 3/2006 | Marcus et al. |
| 7,029,283 | B2 | 4/2006 | Marcus et al. |
| 7,040,898 | B2 | 5/2006 | Marcus et al. |
| 7,050,754 | B1 | 5/2006 | Marcus et al. |
| 7,214,066 | B2 | 5/2007 | Marcus et al. |
| 7,217,135 | B2 | 5/2007 | Marcus et al. |
| 2001/0036862 | A1 | 11/2001 | Kitamori et al. |
| 2002/0021289 | A1 | 2/2002 | Combs et al. |
| 2002/0039924 | A1 | 4/2002 | Okada et al. |
| 2002/0080112 | A1 | 6/2002 | Braun |
| 2002/0094852 | A1 | 7/2002 | Fujioka et al. |
| 2002/0137566 | A1 | 9/2002 | Tomizawa et al. |
| 2002/0173360 | A1 | 11/2002 | Tanaka et al. |
| 2003/0030619 | A1 | 2/2003 | Martin et al. |
| 2003/0162162 | A1 | 8/2003 | Marggraff |

OTHER PUBLICATIONS

Battenberg, et al.; Touch Screen Versus Keyboard: A Comparison of Task Performance of Young Children; *Journal of Special Education Technology;* Fall 1989; pp. 24-28; vol. X; No. 1.

Eiser, Leslie; Picks of the Month, Bailey's Book House; *Technology & Learning;* Sep. 1993; pp. 8-9; vol. 14; No. 1.

Piernot, et al.; Designing the PenPal: Blending Hardware and Software in a User-Interface for Children; *Proceedings of the Conference on Computer Human Interaction (CHI '95);* 1995; pp. 511-518; Chicago.

PenPoint User Interface Design Reference: Go Corporation Go Technical Library: Apr. 1992; pp. 1-300; Reading, MA.

* cited by examiner 301 302 303 304 305 306

INTERACTIVE HAND HELD APPARATUS WITH STYLUS

CROSS-REFERENCES TO RELATED APPLICATIONS

The present application a continuation application of U.S. patent application Ser. No. 10/775,830, which is a non-provisional of and claims the benefit of priority under 35 U.S.C. § 119 from U.S. Provisional Patent Application Ser. No. 60/446,829, entitled "INTERACTIVE HANDHELD APPARATUS WITH STYLUS" filed on Feb. 10, 2003, and U.S. Provisional Patent Application Ser. No. 60/512,326, entitled "INTERACTIVE HANDHELD APPARATUS WITH STYLUS" filed on Oct. 17, 2003, the disclosures of which are hereby incorporated by reference in their entirety for all purposes. This patent application is also related to U.S. patent application Ser. No. 10/776,012, filed on Feb. 9, 2004, entitled "INTERACTIVE HANDHELD APPARATUS WITH STYLUS", which is herein incorporated by reference in its entirety for all purposes.

BACKGROUND OF THE INVENTION

A number of handheld educational products exist on the market today. One handheld product is called Pixter™, which is produced by Mattel, Inc. This product is similar to a PDA (or personal digital assistant). It has a body with a display screen and a stylus that allows a child to select items displayed on the display screen. A number of different games can be played with the product.

While the Pixter™ product is useful and entertaining, a number of improvements can be made. For example, because the stylus is the only means by which data can be input into the product by a child, the number and types of programs that can be played with the product are limited. Moreover, the users of the product are typically children and it is desirable to facilitate game play and refine fine motor skills. Since only one input mechanism is present, the product's ability to enhance those fine motor skills is limited. It would also be desirable to provide for a handheld gaming apparatus that has different input mechanisms so that a child's interaction with the apparatus is enhanced.

Embodiments of the invention address these and other problems.

SUMMARY OF THE INVENTION

Embodiments of the invention are directed to interactive, handheld apparatuses, and methods for using such apparatuses.

One embodiment of the invention is directed to an interactive, handheld apparatus comprising: a housing; a display screen on the housing, the display screen configured to display a plurality of images; an electronic position location system, wherein the electronic position location system includes a processor that is capable of determining a location of a selected region of the display screen; a stylus for selecting one or more of the plurality of images on the display screen; a directional control pad on the housing; and a memory device comprising code for a first educational program and code for a second educational program, wherein the first educational program comprises an educational game that uses the directional control pad and wherein the second educational program uses the stylus and the electronic position location system.

Another embodiment of the invention is directed to an interactive, handheld apparatus comprising: a housing; an LCD display screen on the housing, the display screen configured to display a plurality of images; an electronic position location system, wherein the electronic position location system includes a processor that is capable of determining a location of a selected region of the display screen; a stylus for selecting one or more of the plurality of images on the display screen; a directional control pad on the housing and being on a left side of the display screen; at least one input button on the housing and being to a right side of the display screen; and a memory device comprising code for a first educational program and code for a second educational program, wherein the first educational program comprises an educational game that uses the directional control pad and wherein the second educational program uses the stylus and the electronic position location system.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION

Figure 1:
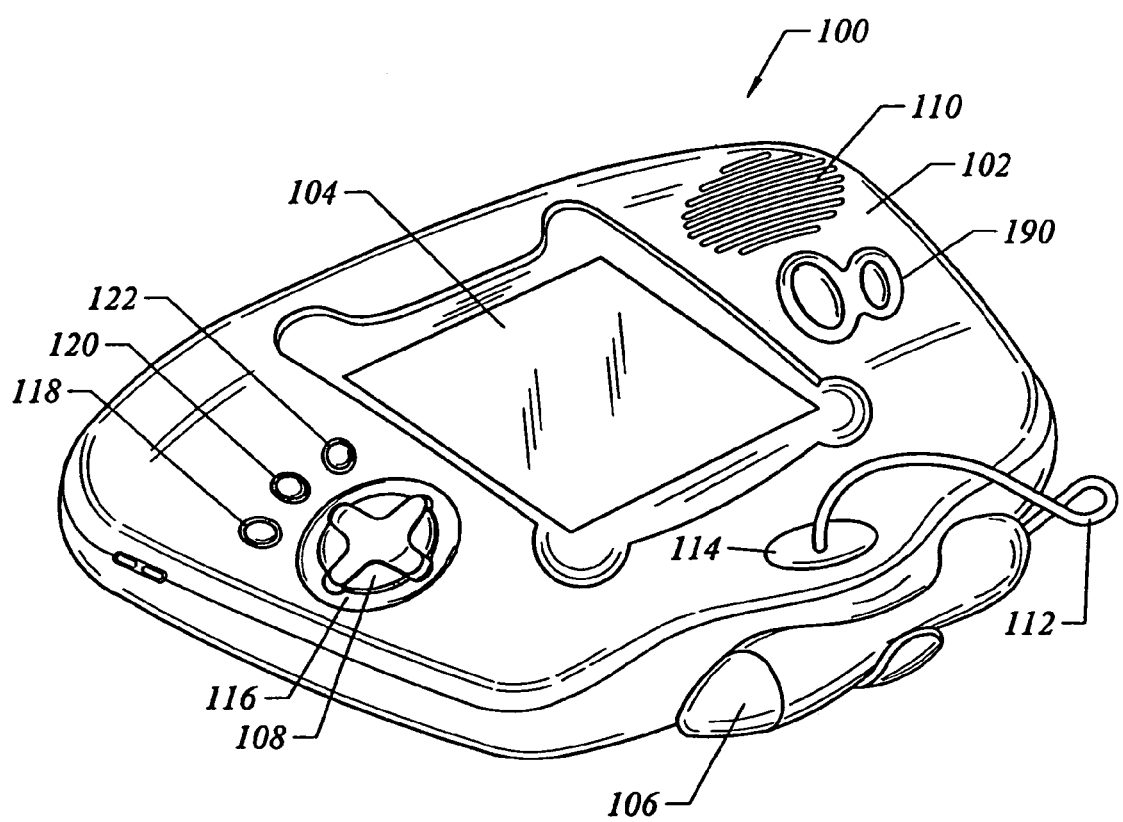
FIG. 1 is a diagram illustrating a top perspective view of an interactive handheld apparatus according to one embodiment of the present invention.
Figure 2:
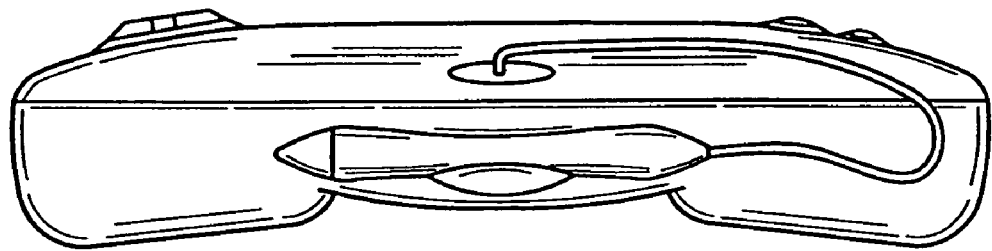
FIG. 2 is a diagram illustrating a front view of an interactive handheld apparatus according to one embodiment of the present invention.
Figure 3:
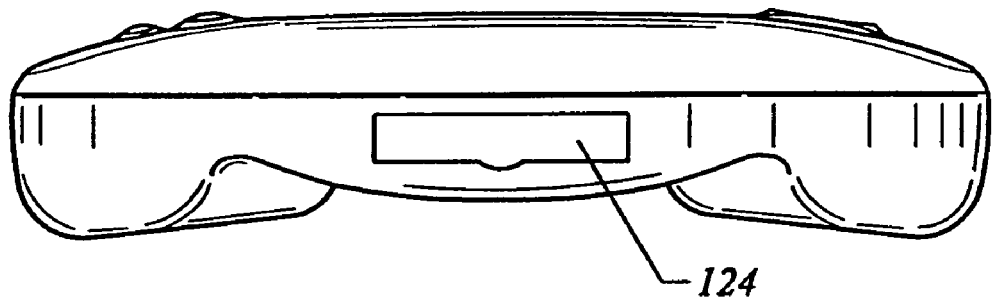
FIG. 3 is a diagram illustrating a rear view of an interactive handheld apparatus according to one embodiment of the present invention.

The present invention in the form of one or more embodiments will now be described. FIG. 1 shows a perspective view of an interactive handheld apparatus according to one embodiment of the invention. In this embodiment, the interactive handheld apparatus 100 includes: (a) a housing 102; (b) a display screen 104 on the housing 102; (c) an electronic position location system, wherein the electronic position location system includes a processor that is capable of determining a location of a selected region of the display screen 104; (d) a stylus 106 for selecting images on the display screen 104; (e) a directional control pad 108 on the housing 102; and (f) a memory device comprising computer code for an educational game, wherein the memory device is operatively coupled to the processor. An audio output device 110 such as a speaker may also be included and may be coupled to the processor. FIGS. 2-3 show front and rear views of the interactive handheld apparatus according to one embodiment of the present invention.

In one embodiment, the housing 102 may be shaped so that it can be held in the hand of a small child. The housing 102 may be made of molded plastic and may be shaped as a trapezoid. Based on the disclosure and teachings provided herein, a person of ordinary skill in the art will appreciate how to utilize various housing shapes for use in accordance with the present invention. A trapezoidal shaped housing is preferred, as it is more ergonomic than, for example, a rectangle shaped housing.

The display screen 104 may comprise any suitable display device. Suitable display devices include, for example, LEDs (light emitting diodes), LCDs (liquid crystal displays), etc. Appropriate driver programs and/or driver chips (e.g., LCD driver chips) can be included in the apparatus 100 to facilitate the function of the display screen 104. For example, in some embodiments, the display screen 104 may comprise an LCD screen having the following specifications including: a square screen size of 2.8", a resolution of 160×160 pixels with a font size of about 7×5 pixels, and base colors based on 12-bit 4-4-4 RGB colors. Backlight for the LCD screen may be generated by using white LEDs with a diffuser. Contrast can be optimized and made adjustable by a user of the apparatus 100 via use of a potentiometer control. In addition, there are two (2) brightness levels or settings for the LCD screen—a low setting optimized for outdoor use and a high setting for internal and low light environment.

In one embodiment, the display screen 104 is used to display images that are rendered using a vector graphics engine, such as, the Macromedia Flash5™ vector graphics rendering engine. Techniques for providing improved vector graphics are described in co-pending, co-owned U.S. Provisional Patent Application No. 60/512,339, entitled "METHOD AND SYSTEM FOR PROVIDING EDGE SMOOTHING," filed on Oct. 17, 2003, the disclosure of which is incorporated by reference in its entirety for all purposes.

Images that are formed using vector-graphics processes are preferred over bit-mapped images, which are used in some conventional gaming devices. A vector-graphics based image is stored in a file as a display list that describes in mathematical terms every shape, or object in the image along with its location and properties such as line width and fill (the color pattern that fills a shape). Moving images based on vector-graphics are generally smoother than corresponding bit-mapped images. This is desirable for providing animation that will entertain and engage a child. In some embodiments, the apparatus can play videos for a child (where the child is a passive observer rather than an active game player) in addition to providing interactive educational programs for children. Images formed using vector-graphics processes also take up less memory than bitmapped images so that many games can be stored in a memory device.

Referring again to FIG. 1, the display screen 104 also has touch-screen capability. In one embodiment, the touch-screen capability is adjusted for stylus sensitivity which allows movement of the stylus 106 on the display screen 104 to be detected. To provide for touch-screen capability, a 1K EEPROM is included in the housing 102 for storing calibration data. Furthermore, the display screen 104 can be made of plastic with an 1.55 mm nominal thickness. Moreover, the LCD screen can float on shock absorbers to protect the screen during impact.

The touch-screen capability is achieved via the electronic position location system. The electronic position location system is capable of determining a location of a selected region of the display screen 104. A commercially available electronic position location system like the ones that are used in many commercially available personal digital assistants may be used. An exemplary system may comprise a glass or plastic plate with a metallic coating facing a metallic coating on an underside of a layer of Mylar™ above the glass or plastic plate. Pressing the screen with the stylus 106 brings the plate and the Mylar™ layer in contact with each other so that an electrical current flows through them. By measuring the electrical current from two sides of the display screen 104, a computer program then determines the vertical and horizontal position of the stylus 106. By sampling contact locations at a predetermined rate, such as, 100 times a second or faster, the display screen 104 can detect the position of the stylus 106. In other examples, there can be a grid of wires under the display screen 104 that can be activated after interaction with the stylus 106. The x-y position can be determined with a processor inside the apparatus 100.

Figure 4:
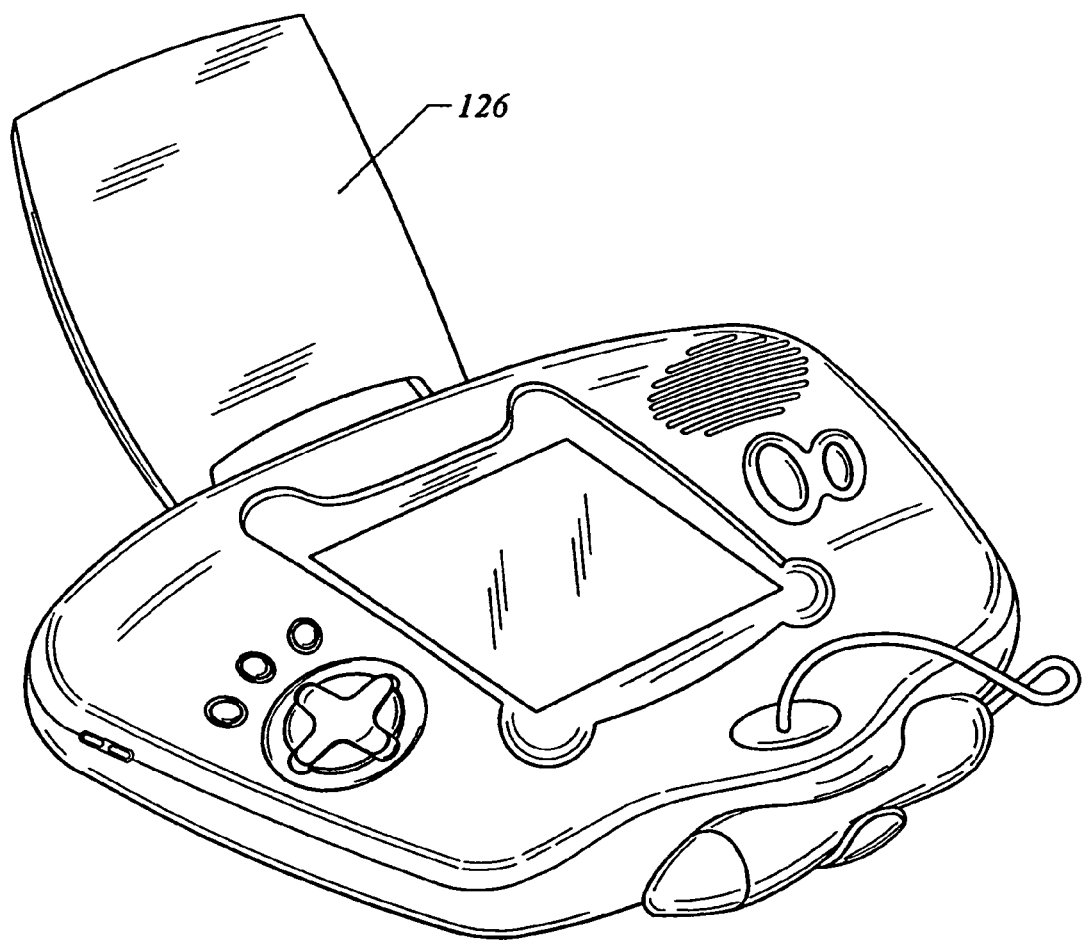
FIG. 4 is a diagram illustrating a perspective view of an interactive handheld apparatus according to one embodiment of the present invention including a cover.

In one embodiment, as shown in FIG. 4, the display screen 104 can be protected by a movable cover 126. Preferably, the cover 126 is made of flexible hard plastic material, and is detachably coupled to a rear portion of the apparatus 100.

The stylus 106 may or may not comprise an electrical conductor, and may or may not be tethered to the housing 102 via a cord 112. In some embodiments, the stylus 106 includes a light and is made of a translucent or transparent material and may be tethered to the housing 102 via the cord 112. The light in the stylus 106 may be an LED. As will be further described below, the light in the stylus 106 may illuminate or flash during operation of the apparatus 100, such as, when a game is being played, to provide indications that the stylus 106 can be used to perform a particular function. The illuminated or flashing light represents directions that are easy to follow by a user, especially, a child. In other embodiments, a light can also or alternatively be included near or behind the cord exit 114 in the housing 102 or in the cord 112. Similarly, the light may illuminate or flash during operation of the apparatus 100.

The directional control pad 108 can be of the type used in commercially available handheld gaming devices. The pad 108 can be depressed to move a cursor up, down, to the left, to the right or to other predetermined directions. The directional control pad 108 allows a user to move a cursor or other image on the display screen 104 to select an image element on the display screen 104. In some embodiments, a light 116 is associated with the directional control pad 108. The light 116 may be under a translucent ring that lights up. Similar to the light behind the cord exit 114 and the light associated with the stylus 106, the light 116 around the directional control pad 108 may also illuminate or flash during operation of the apparatus 100 to provide indication to the user to use the directional control pad 108 to perform a particular function. In another embodiment, there can be a light in the directional control pad 108 itself.

As mentioned above, in some embodiments, the stylus 106 and the directional control pad 108 may have lights associated with them (e.g., lights that are in them, or adjacent to them). Different games that are played with the apparatus 100 may use the directional control pad 108 or the stylus 106 as input devices. The apparatus 100 may be programmed to cause the light associated with either the stylus 106 or the directional control pad 108 to light up or flash if an indication is to be given to a user that either the stylus 106 or the directional control pad 108 is to be used as an input device. This is particularly useful if the user of the apparatus 100 is a young child (e.g., children in kindergarten, first, or second grade) who may not know what input device to use.

In addition to or as an alternative to using lights to inform a child as to which input device to use, an image may show on the display screen 104 to inform the child as to what input device to use. A synthesized voice from the apparatus 100 may say, "to play this game, use the pen (i.e., the stylus)" if a program that uses a stylus is about to be played by a child. Thus, the apparatus 100 (or a memory device associated with the apparatus) can be preprogrammed with computer code for informing a user to use the stylus 106 prior to using a first program that uses the stylus 106 and computer code for informing a user to use the directional control 108 pad prior to using a second educational program that uses the directional control pad 108.

Other input devices, in addition to the stylus 106 and the directional control pad 108, can be included in the apparatus 100. For example, as shown in FIG. 1, a "hint" button 118 may be provided to give the user a hint on how to play a game using the apparatus 100. Hints can be provided directly to the user upon activation of the "hint" button 118 and are unique to some embodiments of the invention since embodiments of the invention are adapted to play educational games. In one embodiment, when the player presses the "hint" button (or if the player selects several incorrect answers), a tutorial is activated for the user. For example, if a player has solved a math equation incorrectly many times in a row, a tutorial will show the equation and then prompt the child to count groups of objects (e.g., carrots) to determine a total. If the player succeeds, game play continues. If not, then another tutorial is provided.

A "home" button 120 may be provided to the user back to home state. For example, the "home" button 120 can bring the user back to the beginning of a game. Also, a "pause" button 122 may be provided to allow the user to pause operation of the apparatus 100. For example, the "pause" button 122 may be used by the user to pause a game in mid-progress.

The apparatus 100 may include a memory device comprising computer code for an educational game and/or for storing computer code that relates to the operation of the apparatus 100. Based on the disclosure and teaching provided herein, various educational games can be played using the apparatus 100. The educational programs and another of the functions described in this application can be programmed by those or ordinary skill in the art using any suitable programming language including C, C++, etc. More detailed descriptions of educational programs are provided below.

The memory device may be any suitable temporary or permanent information storage device. For example, the memory device may include one or more of optical, magnetic, or electronic storage media such as optical or magnetic disks, tapes, sticks, and the like. Storage devices such as these may be used alone or in combination to make up the memory device. Any suitable number of RAM (random access memory), ROM (read only memory) and EPROM (erasable programmable memory) chips may also be included in the memory device. In some embodiments, the ROM can include a memory storage capacity of about 2 MB (megabytes) or more, although the storage capacity is likely to change as data storage technology improves. The memory device may be internal and/or external to the housing of the apparatus 100.

Furthermore, the memory device may be or include a cartridge (e.g., in a flash data cartridge), a disk, a tape, or a memory stick. Cartridges are especially desirable since they can be easily manipulated and handled by children. Any suitable amount of storage space may be provided on the memory device. Preferably, the capacity of the memory device is at least about 1 megabyte (e.g., 4 megabytes or more). Storage capacity can increase as storage technology improves.

In one embodiment, as shown in FIG. 3, a cartridge (not shown) can be received by an opening 124 in the housing 102. The opening 124 includes appropriate circuitry that allows data from the cartridge to be read. The use of cartridges provides interchangeability.

Any suitable power source may be used. For example, rechargeable or non-rechargeable batteries can be used with the apparatus 100. A battery pack that can use rechargeable batteries that is suitable for use in the apparatus 100 is described in U.S. patent application Ser. Nos. 10/697,074, filed on Oct. 22, 2003, and 60/506,254, filed on Sep. 26, 2004, which are herein incorporated by reference in their entirety.

Figure 5:
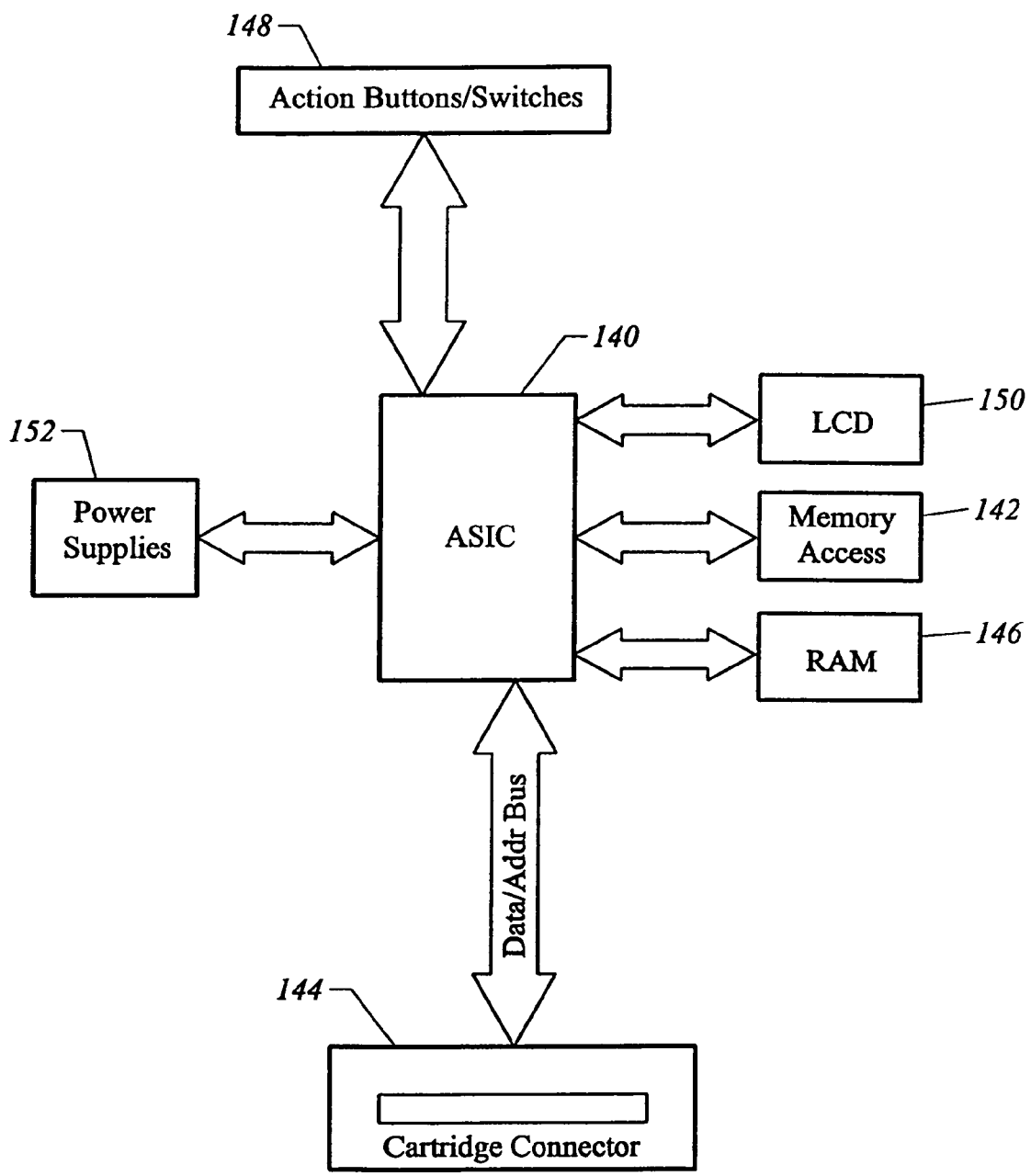
FIG. 5 is a schematic block diagram illustrating the various components of the interactive handheld apparatus according to one embodiment of the present invention.

FIG. 5 is a schematic block diagram illustrating the various internal components of the apparatus 100 according to one embodiment of the present invention. As shown in FIG. 10, the apparatus 100 includes an application-specific integrated circuit (ASIC) 140. The ASIC 140 further includes a microprocessor and other internal circuitry. The ASIC 140 controls the operations of the apparatus 140 and manages interactions amongst various components including a memory access component 142, a cartridge connector 144, a random access memory component 146, a buttons and switches component 148, an LCD component 150, and power supply circuits 152. Additional schematic block diagrams showing the various components will be provided below.

Figure 6:
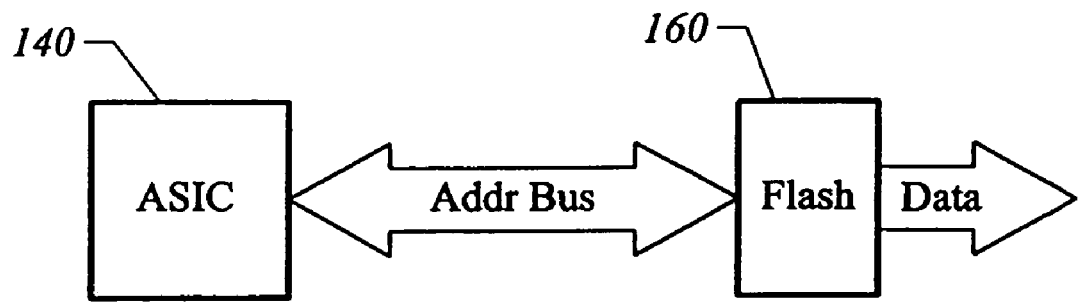
FIG. 6 is a schematic block diagram further illustrating the memory access component of the interactive handheld apparatus according to one embodiment of the present invention.

FIG. 6 is a schematic block diagram further illustrating the memory access component 142 according to one embodiment of the present invention. The memory access 142 further includes a FLASH integrated circuit 160. The FLASH integrated circuit 160 is used to store the boot code for the apparatus 100. The boot code is used to initiate operations of the apparatus 100.

Figure 7:
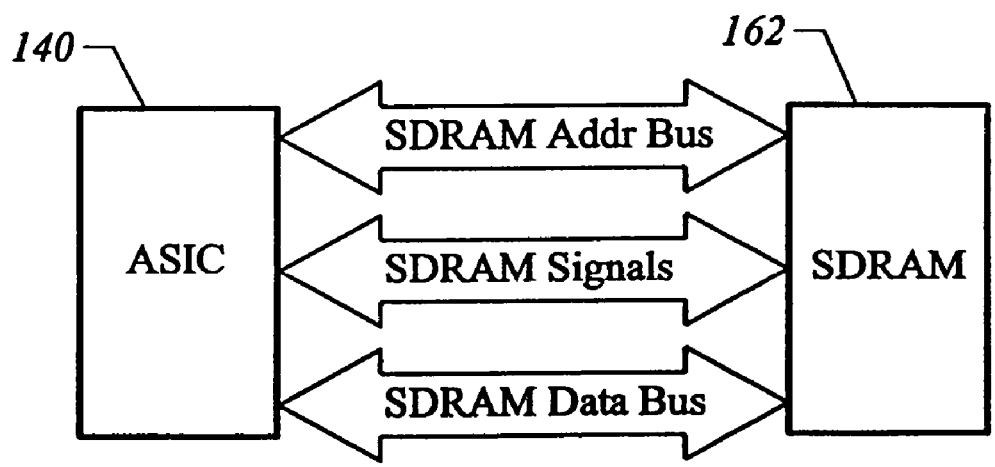
FIG. 7 is a schematic block diagram further illustrating the random access memory component of the interactive handheld apparatus according to one embodiment of the present invention.

FIG. 7 is a schematic block diagram further illustrating the random access memory component 146 according to one embodiment of the present invention. In one embodiment, the random access memory component 146 includes a SDRAM 162. The SDRAM 162 is used to provide temporary storage for executable code during operations of the apparatus 100.

Figure 8:
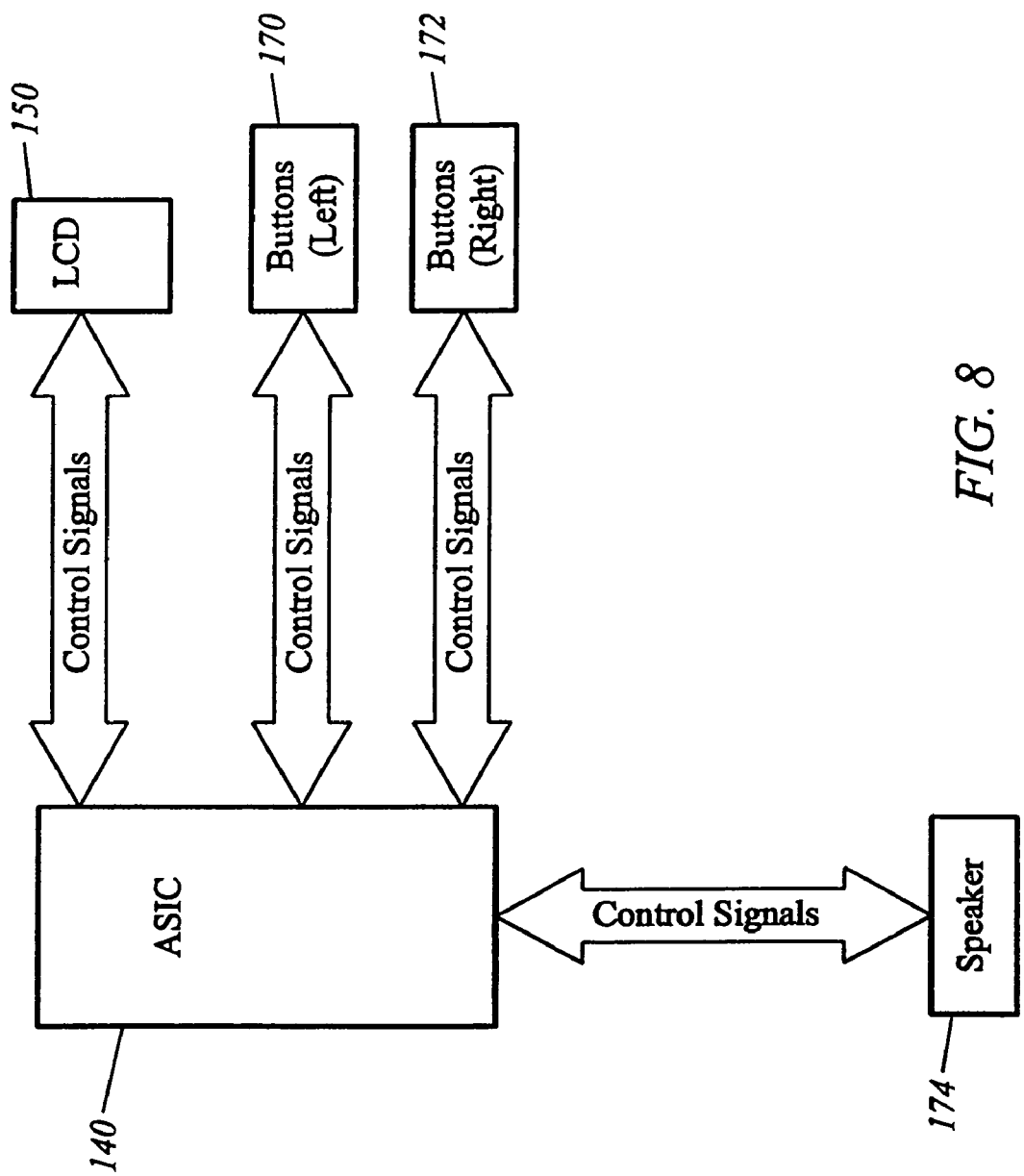
FIG. 8 is a schematic block diagram further illustrating the buttons and switches component and the LCD component of the interactive handheld apparatus according to one embodiment of the present invention.
Figures 1, 9A:
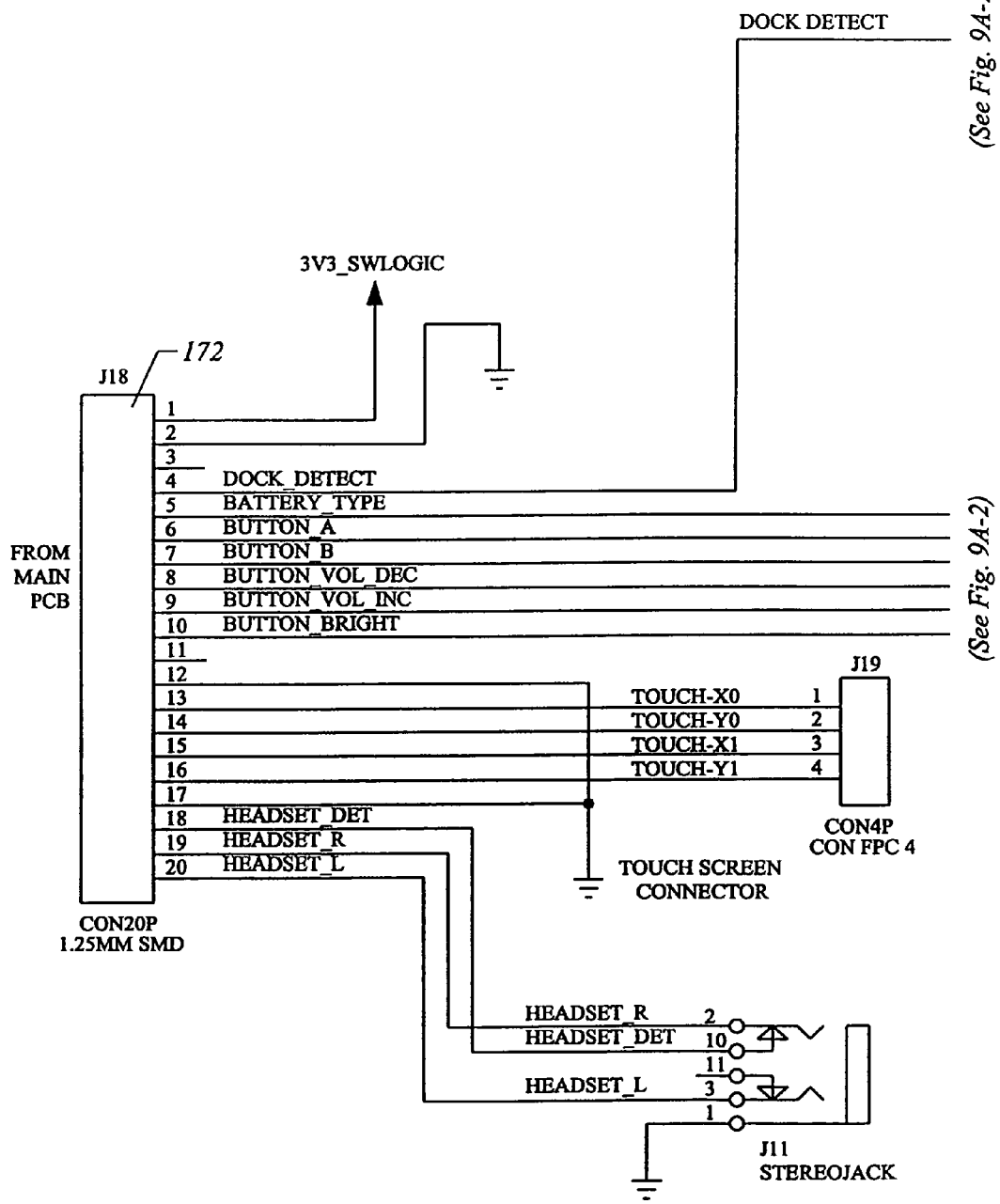
FIGS. 9a and 9b are schematic diagrams further illustrating the buttons and switches component according to one embodiment of the present invention.
Figure 9A:
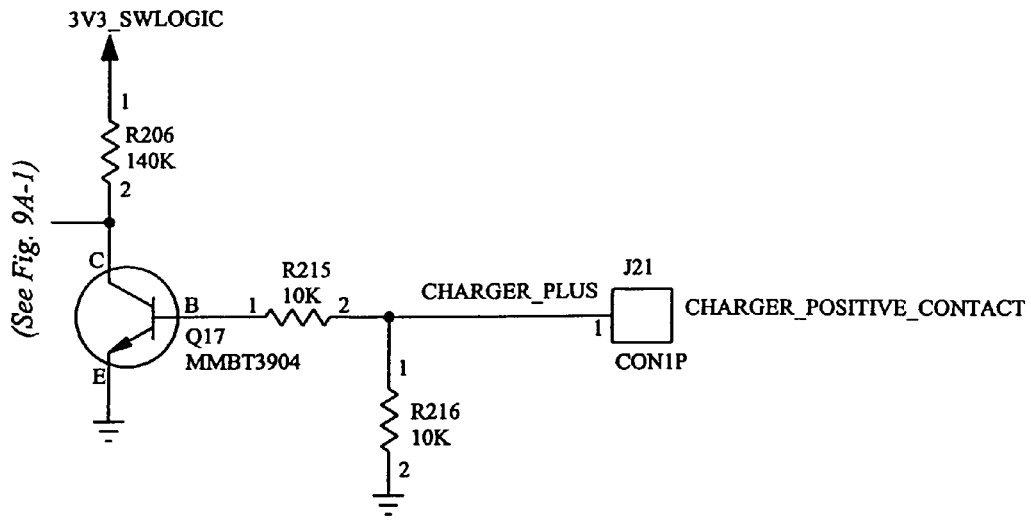
Figure 2:
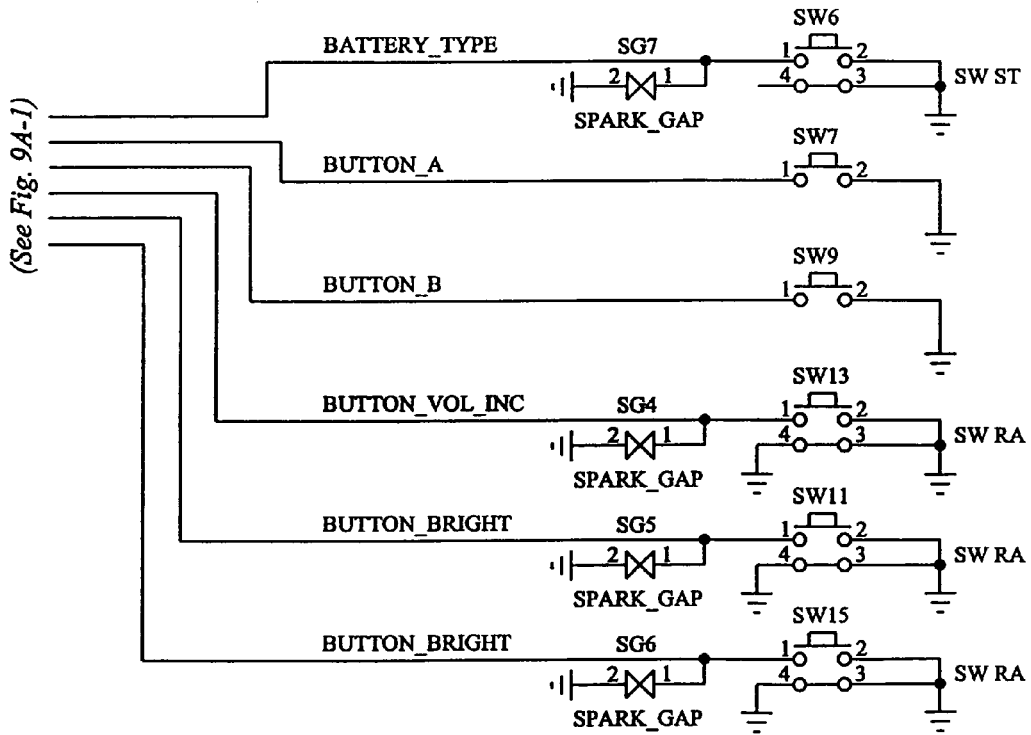
Figures 1, 9B:
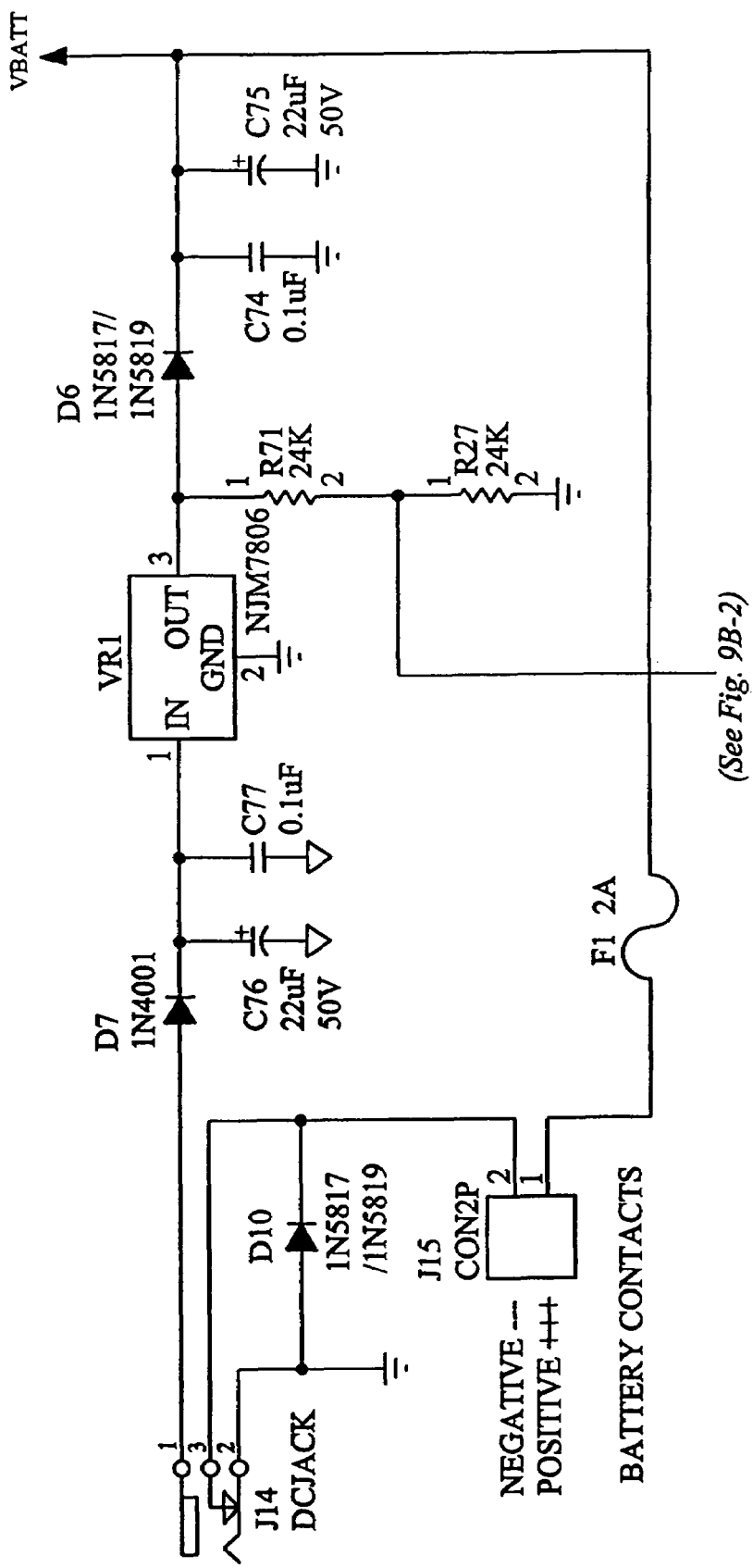
Figures 2, 9B:
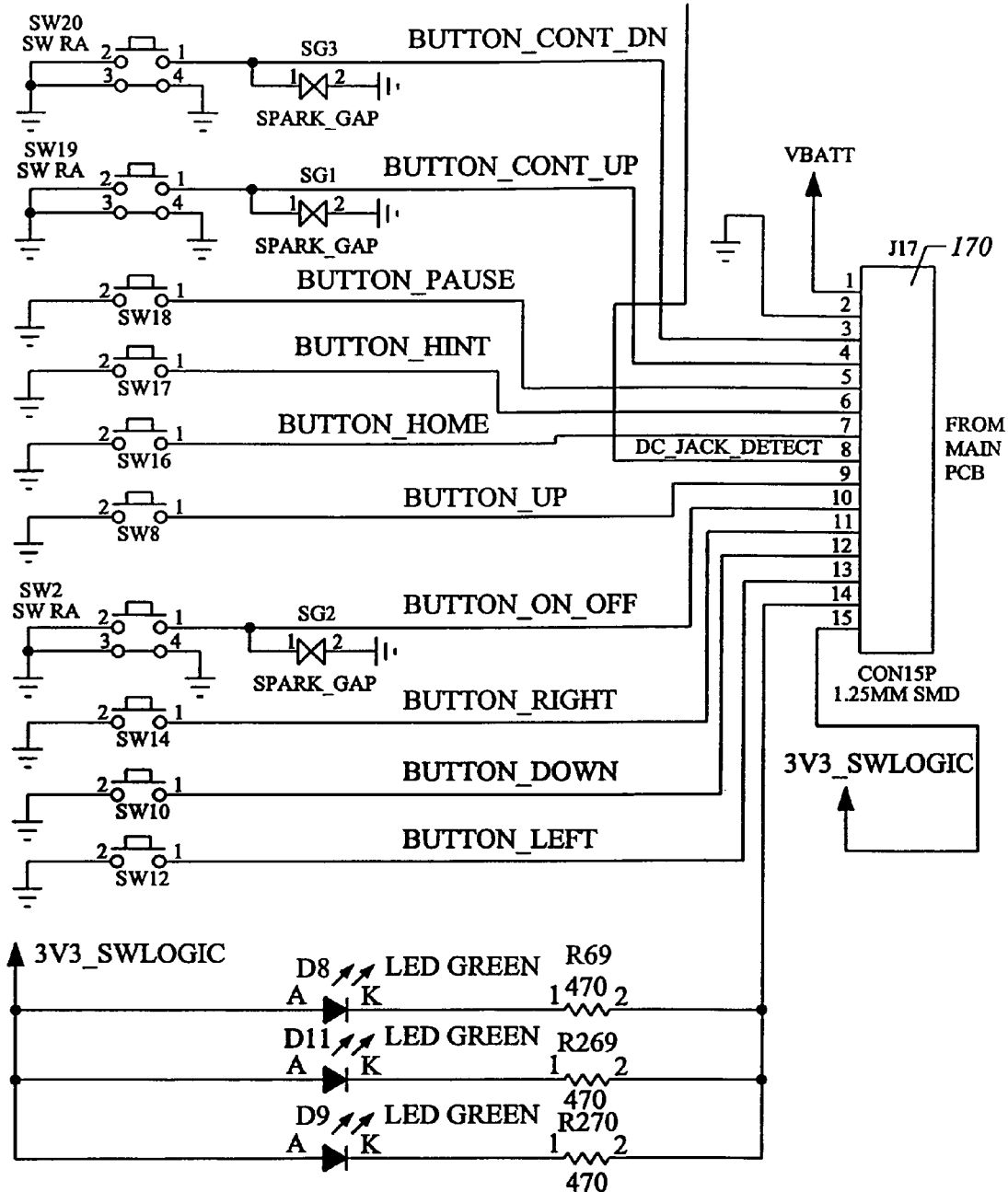
Figure 10A:
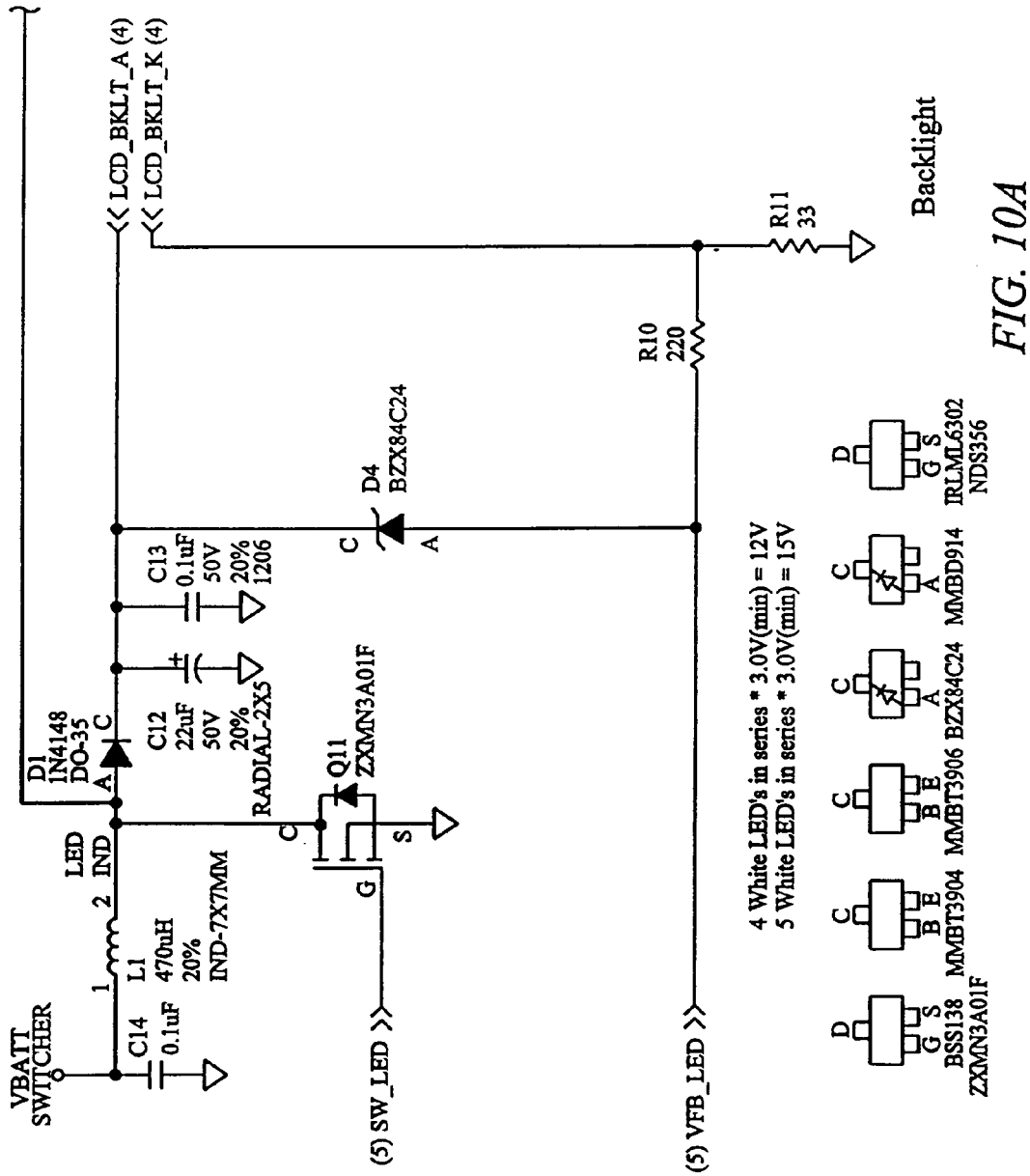
FIGS. 10a-e are schematic block diagrams further illustrating some of the power supply circuits within the interactive handheld apparatus according to one embodiment of the present invention.
Figure 10B:
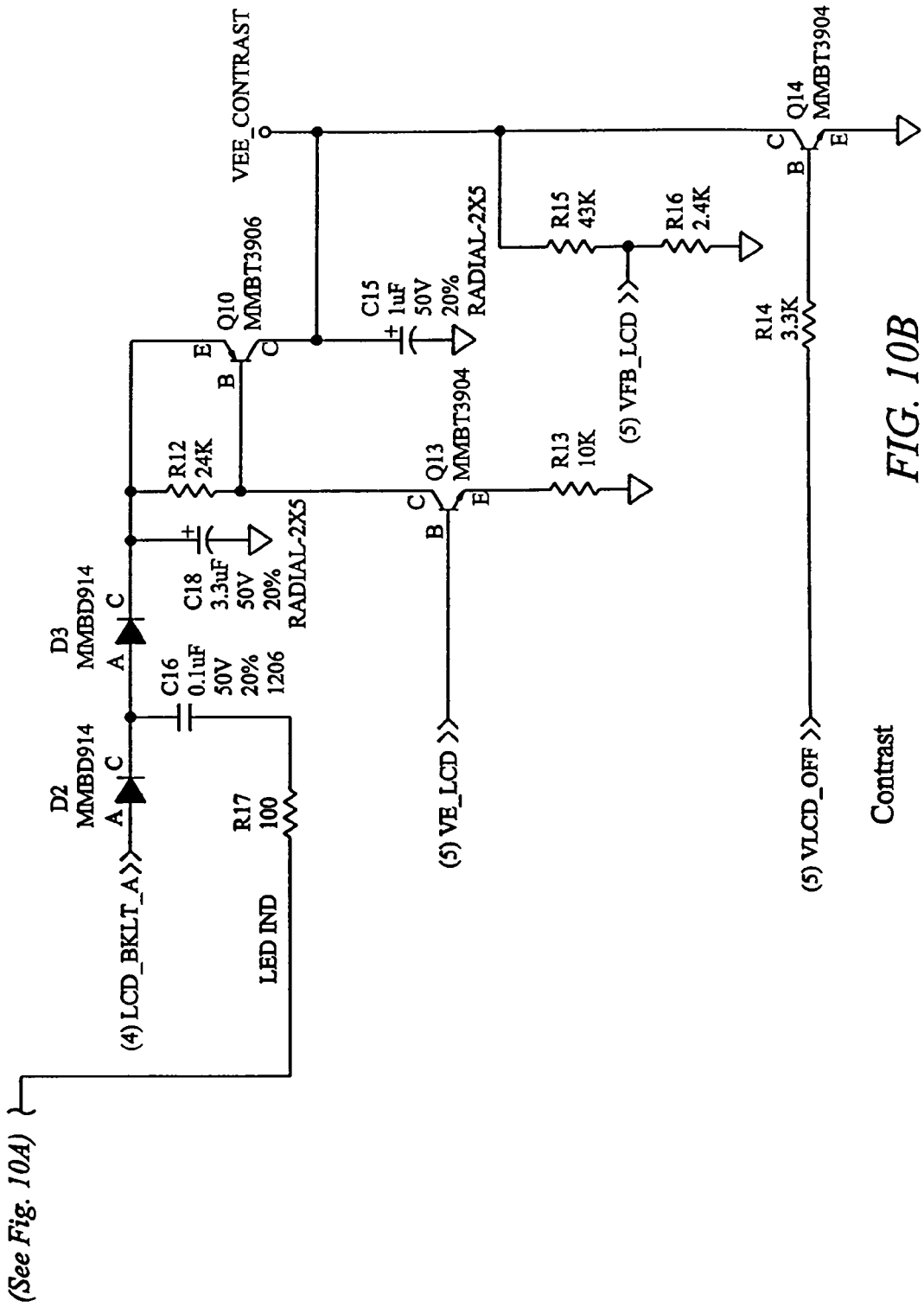
Figure 10D:
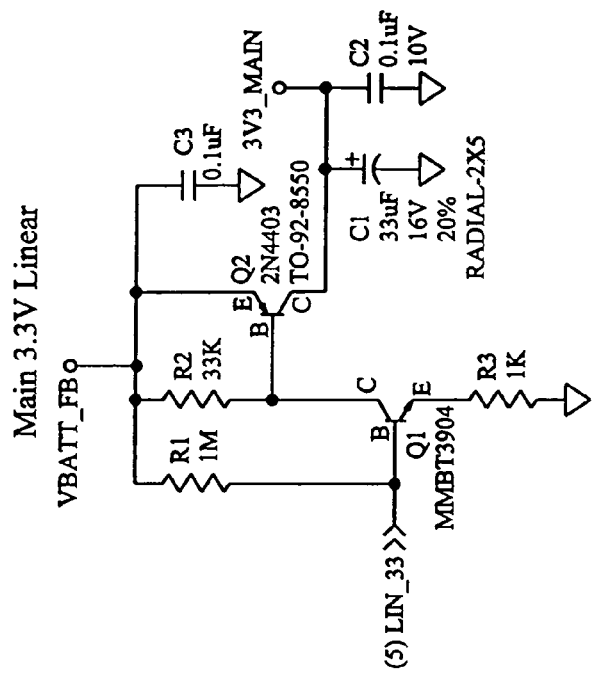
Figure 10C:
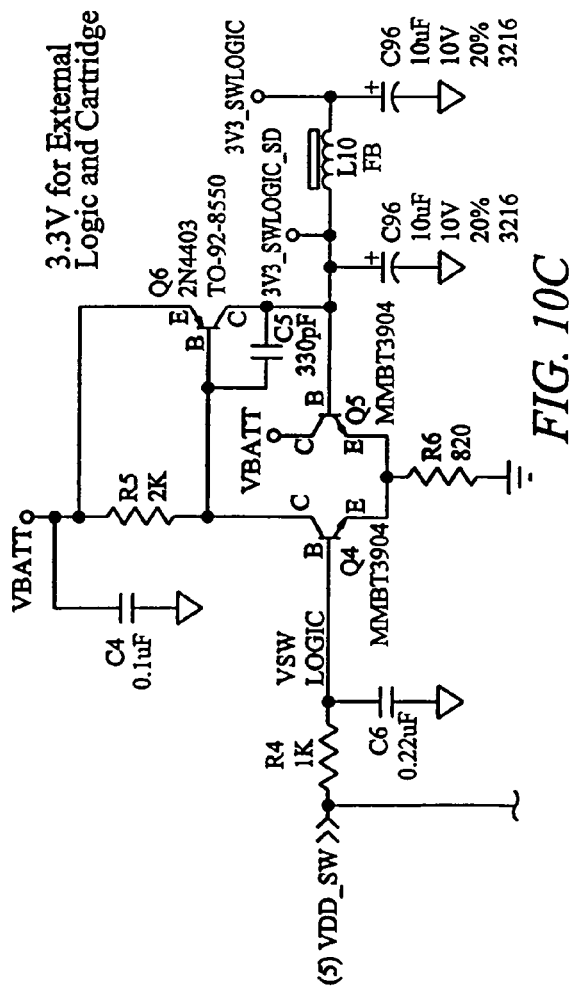
Figure 10E:
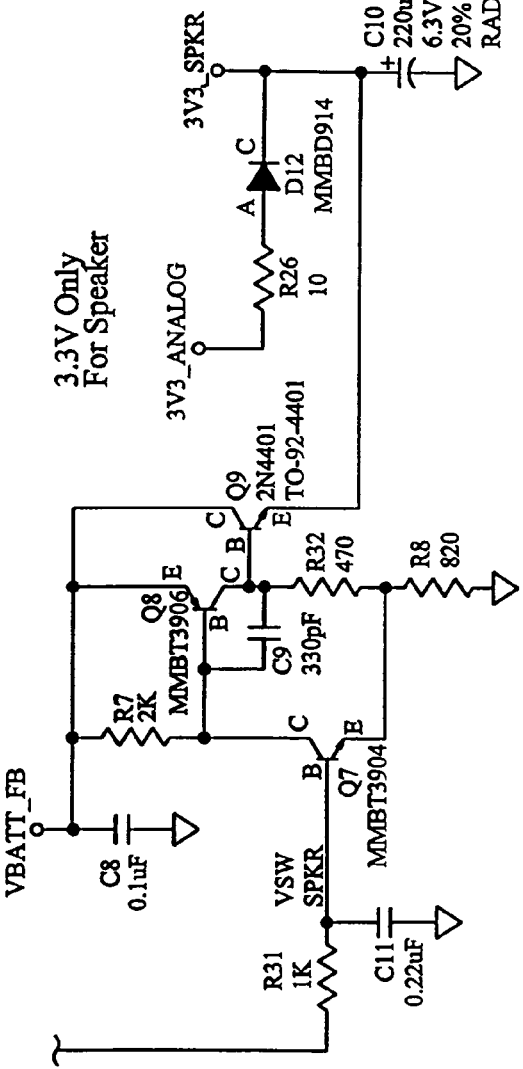

FIG. 8 is a schematic block diagram further illustrating the buttons and switches component 148 and the LCD component 150 according to one embodiment of the present invention. In one embodiment, two sets of control signals are provided by the ASIC 140 to control two groups of buttons 170 and 172. FIGS. 9a and 9b further illustrate additional circuitry that are provided for the two groups of buttons 172 and 170 respectively. In one embodiment, the ASIC 140 also controls the speaker 174.

FIGS. 10a-e are schematic block diagrams further illustrating some of the power supply circuits controlled by the ASIC 140 according to one embodiment of the present invention.

Various additional features of the apparatus 100 are now described. In one embodiment, the apparatus 100 provides independent, runtime-replaceable, execute-in-place code modules with cartridge-based code and content. In one implementation, some or all code components of the boot code for the apparatus 100 and cartridges are built as independent, replaceable code modules. Examples are the kernel, audio subsystem, user interface manager, Resource Information Block (RIB) file system manager, and a port of Macromedia's FlashPlayer. Upon boot-up of the apparatus 100, boot code searches a memory device, such as, the FLASH integrated circuit as described above, and all attached cartridge or peripheral devices for code modules and registers them one-by-one in a system module table using a predefined, unique ID value for each module.

Code modules include their specific corresponding version numbers. If multiple versions of the same code module (e.g. the audio subsystem) are present at the same time, the boot process selects the most current version of that code module for installation. Each code module defines a module public interface (MPI) which provides all other code modules in the apparatus 100 with a function call interface to the code module's services. All MPI calls are routed (or "dereferenced") through the system module table at runtime. By doing so, compile-time function calls can be resolved at runtime thereby allowing the latest version of the corresponding code module to be accessed. One of the primary benefits of the MPI design is that code updates can be delivered on cartridge or peripheral devices over the lifetime of the product, automatically "patching" the memory device at runtime (or other cartridges/peripheral devices present in a runtime configuration) to fix bugs, improve performance and/or introduce new features.

In one embodiment, the apparatus 100 provides a method for identifying all constituent parts of a binary image by data type, data format version, and content version and a mechanism for their search and retrieval at runtime, individually or by group, based on item-specific properties. All components of a memory device or cartridge including binary code modules, audio, animations, fonts and other content assets are considered "resources" of the binary image. Each resource is either referred to or completely defined by a data structure entry in a larger structure called the Resource Information Block (RIB). One or more RIB structures exist on all memory devices in the apparatus 100 containing prebuilt code and/or data. The RIB effectively serves as each binary's "file system." It is through the RIB and its associated interface routines that system and application code access the resources of a binary image. All resources are defined by their data type, data format version and content version. Developers can write code to search the contents of all binaries present in a runtime configuration of devices—the memory device and zero or more cartridge or peripheral memory devices—filtering the search to only those resource properties or property values of interest. As an example, as part of the startup code module installation process, boot code might request a search of all present RIBs (binary images) for the most current version of the kernel code module. Another example would be if an application requested a search of all present RIBs for all configuration data resources of type 'x' that conform to type 'x' data format versions 1.0-2.0.

This architecture has many advantages to the developer. For example, applications can be designed with a plug-in framework for features, where features can be dynamically added or removed based on the needs of application content. Applications gain from this both extensibility, where new features can be introduced on cartridge or peripheral devices long after the base application code is shipped, and footprint efficiency, where RAM or ROM space is saved by not including or loading features not currently required by the running application content.

In one embodiment, the apparatus 100 provides a method for dynamic update of audio and graphic content assets based on content version number in a cartridge-based handheld electronic device. All components or "resources" in a binary image on a memory device, for example, a ROM, cartridge, or other peripheral device, have a specific data type and data content version associated with them. Apparatus 100 uses numerous types of content assets including raw and compressed audio, multi-toned digital musical instruments, multi-track instrument playback data (similar to MIDI), bit-map fonts, and Macromedia Flash animations. Specific instances of content assets are assigned an ID value which uniquely identifies the content globally among all content developed of that type, across all compatible products. There is no restriction placed on the number of duplicate instances of asset data of a given type with a specific ID that may be present in a joined, runtime configuration of memory devices. In practice, duplicates are present when a new version of the asset is introduced that differs in content from previous versions. The desired behavior in most applications is for the most current version of a given asset to be used, so all code modules that make use of audio, graphic or similar content assets use a standard methodology for resolving runtime requests for specific asset resources into the most current version of the resource. On system boot, code modules configure themselves by searching all memory devices' RIBs for assets they make use of, and sort the resulting list by content version number. When playback or other use of an asset is requested of the code module, the sorted list is searched in content version order such that the newest version of an asset will always be used.

This architecture allows new memory devices to "patch" existing content by providing revised versions of existing assets, whether to fix bugs in old content or dynamically refresh its look or sound.

In one embodiment, the apparatus 100 provides a method for exporting binary image component data and properties, such as, resources or resource references, from source code to a Windows-based code and data packing tool for inclusion in the binary image's RIB. Resources and resource references can be exported from any source code file to a Windows-based code and data packing tool using a combination of C/C++ language macros, segmentation of generated structures in the code link map, and dual final binary links—one of which creates the standard runtime code and data file, and the second of which extracts the exported data structures from object code into a data file for use as input to the code and data packing tool.

In one embodiment, the apparatus 100 provides a method for using audio asset placeholders or "tokens" that are resolved to playable, platform-specific audio data references upon compiling and/or running the content on a given (embedded or non-embedded) target platform. Developers for the apparatus 100 may use off-the-shelf, PC-based Macromedia FlashMX application to develop content for the apparatus. Macromedia Flash does not provide native support for special audio formats, including highly compressed recorded human speech. A scheme is developed for inserting Flash-acceptable placeholders or "tokens" in the Flash content that development tools or software resolve to references to audio content on compiling and/or running the Flash content in a PC-based emulator or on the apparatus.

Educational Programs

In some embodiments, when a child starts to use the apparatus 100, there may be a sign in page (not shown) that will allow the user to "sign in" before using the apparatus 100. The apparatus 100 may store information for up to 3 players. This may be useful, in case, there is only one apparatus in a household, but there are more than 2 children in the household. A child's interactive history with the apparatus 100 may be stored in the apparatus 100 for future game play or future interaction.

Figure 11:
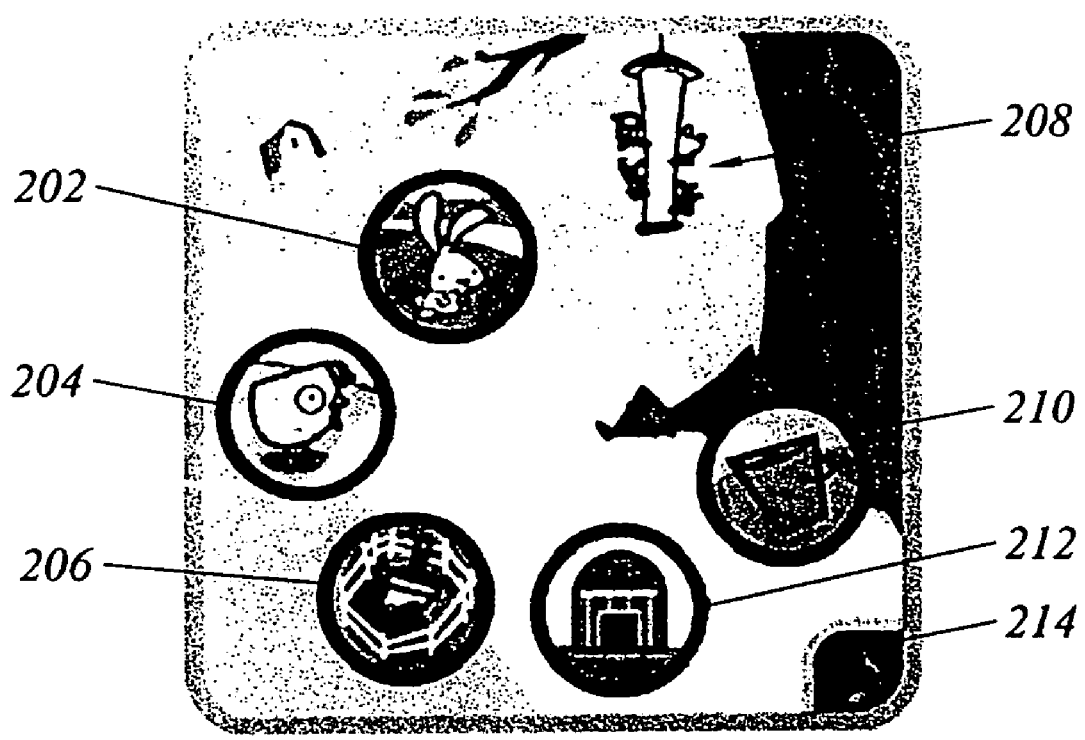
FIG. 11 shows a screenshot of a home page.

FIG. 11 shows a screenshot for a homepage and 12*a*-12*f* show various screenshots associated with various educational programs that can be played on the above-described apparatus 100. The various educational programs include at least a first program that is used with the above-described directional control pad 108 and at least a second educational program that is used with the above-described stylus 106. Thus, children can learn to manipulate different input devices to not only facilitate game play, but also to help refine fine motor skills such as hand-eye coordination. Providing many different games that use different input mechanisms also makes the apparatus 100 more fun for a child as a child can not only play games, but can paint, write, draw, etc. with the apparatus 100. In some embodiments, when using the apparatus 100, a child can be creative using the stylus to draw or paint, or can have fun playing educational games.

As noted below, in some embodiments, the educational programs can comprise games which teach reading and math skills at different levels of difficulty, adjusting the challenge from preschool through first grade. Each level increases in complexity of both the skills being taught and the facility needed to play the games. Players can select or change difficulty levels at the start of each game or after each game round. Alternatively, the difficulty level may automatically adjust in response to the user's play.

Although certain programs are described in detail below, it is understood that embodiments of the invention are not limited thereto. The educational programs may relate to any suitable subject including: math (addition, subtraction, division, multiplication); spelling; number, letter, or shape recognition; phonics; drawing; writing; coloring; fun facts; history; and pattern matching, etc.

FIG. 11 shows a screenshot of a home page including a number of selectable icons. An icon 214 to turn background music on or off is also provided on the home page. The illustrated home page includes a first icon 202 associated with a program called "Rabbit River™", a second icon 204 associated with a program called "The Chicken Coop™", a third icon 206 associated with a program called "The Color Corral™", a fourth icon 212 associated with a program called "The Shape Shop™", a fifth icon 210 associated with a program called "Catcher Fields™", and a sixth icon 208 associated with a program called "Musical Meadow™". Each of these programs is described in further detail below.

Figure 12A:
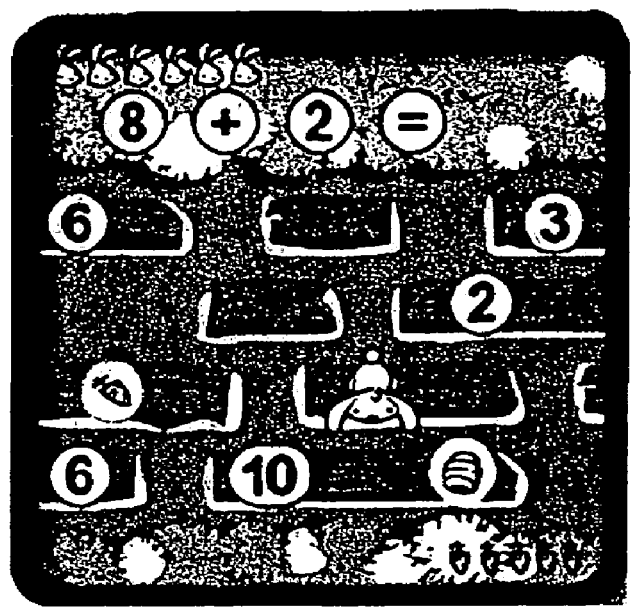
FIGS. 12a-12f show screenshots for various educational programs that can be used in the apparatus.

FIG. 12*a* shows a screenshot corresponding to a program for a game called "Rabbit River™", which uses the directional control pad 108. In this game, rabbits want to cross a river to reach a harvest of vegetables. Players use arrow keys to help the rabbits hop onto logs with letters, shapes, numbers, and mathematical equations. The object of the game is to get all rabbits across the river by responding to questions. Players can obtain bonus points for landing on carrots.

This program teaches about recognizing numerals, and making the connection between numerals and their values, comparing and ordering numbers, counting, recognizing basic math operations and their functions, and solving math equations. In a first skill level, players identify numbers and distinguish numerals from letters and shapes, and count in sequence from 1 to 10. In a second skill level, players count in sequence from 1 to 99; skip count by 2s, 5s, and 10s; and count backwards from 10. In a third skill level, players identify addition and subtraction symbols, and use them to create and solve addition and subtraction problems.

Figure 12B:
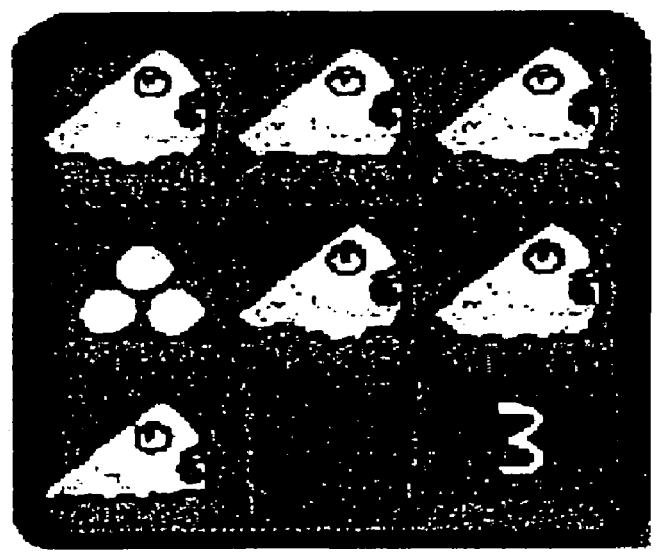

FIG. 12*b* shows a screenshot associated with a program called "The Chicken Coop™", which uses the stylus 106. In this memory game, players make matches to clear the chicken coop. Touch a chicken with the stylus 106 and it flies off to reveal what is underneath—a letter, a number, a color or a shape. Touch a second chicken with the stylus 106 to make a match. If it is a match, items clear from the screen. If not, the chickens return to their roost. Players are scored based on how quickly they have cleared the coop.

In this game, children learn to recognize and remember complex sets of colors, shapes, numbers, and letters. Children also lean about the position of objects in relation to one another. In a first level, players match colors, shapes, numbers (1-10) and letters; numbers to quantities; and letters to their sounds. In a second level, players match combinations of colors and shapes; numbers (10-50); capital to lowercase letters; and sounds. In a third level, players match musical instruments to their sounds; animals to their sounds; initial letters and sounds to words; rhyming words; and opposites.

Figure 12C:
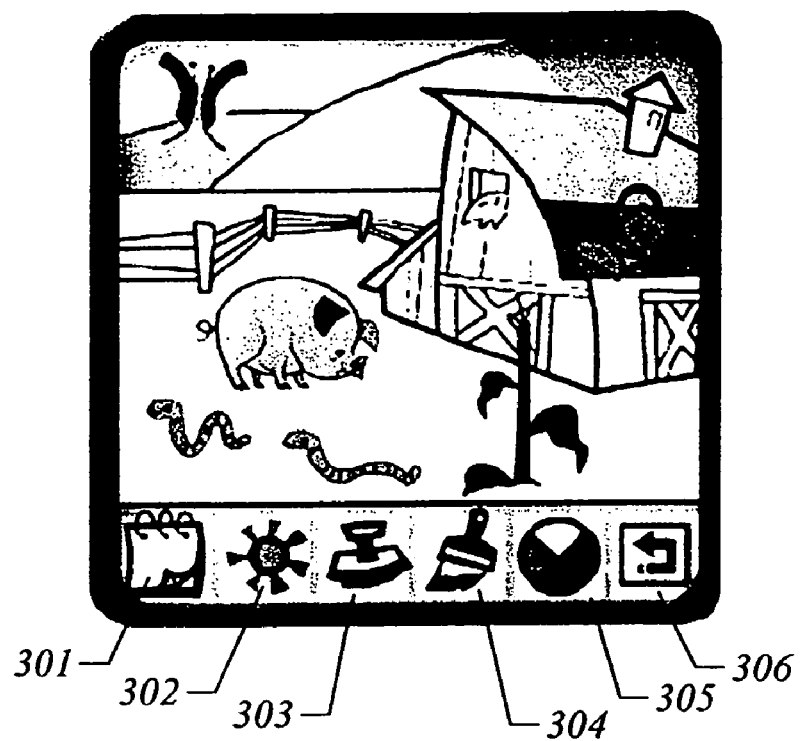

FIG. 12*c* shows a screenshot from a program called "The Color Corral™", which uses the stylus 106. In this program, a child can create his or her own unique farm drawing. A child uses the above-described stylus 106 with this program. Starting from the bottom left to the bottom right, the screenshot includes first, second, third, fourth, fifth, and sixth icons 301-306. The first icon 301 allows a user to select different backgrounds to paint. The second icon 302 allows a child to change atmospheric options (day and night, and snow and rain). The third icon 303 allows one to add stamps to pictures. The fourth icon 304 allows a child to select from a paintbrush, a paint bucket, a crayon, and an eraser to modify the drawing. The fifth icon 305 allows a child to select a color or a pattern. The sixth icon 306 allows a user to undo the last action.

In this program, players use their imagination and explore new ways of seeing things. They can create a farm scene with a polka-dot barn and plaid grass. Using this program, imagination and creativity are encouraged.

Figure 12D:
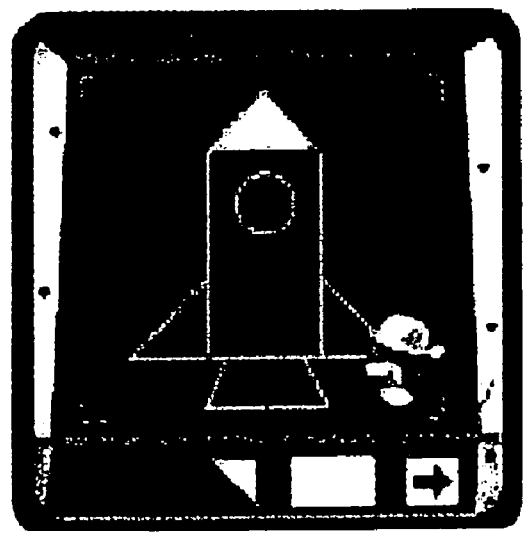

FIG. 12*d* shows a screenshot associated with a program called "The Shape Shop™", which uses the stylus 106. In this game, a mouse, Lily, is helping mice on the farm by building things for them. Players use the stylus 106 and drag shapes to build objects from Lily's blueprints. Once each object is build, it comes to life. Players are scored for every three items they build. Children learn about shapes and the relationship of parts to a whole, by completing puzzles of increasing complexity.

In a first skill level, players match basic shapes to their outlines to fill an area. In a second level, players build objects, using their memory to recall the shapes that make up the whole item. In a third level, players build objects based on outside outlines only, and then predict the figure that will be formed by combining several shapes. Other play modes include combining basic shapes to build original pictures (free play); noting similarities and differences among shapes (visual discrimination); and understanding the position of objects in relation to one another (spatial relationships).

Figure 12E:
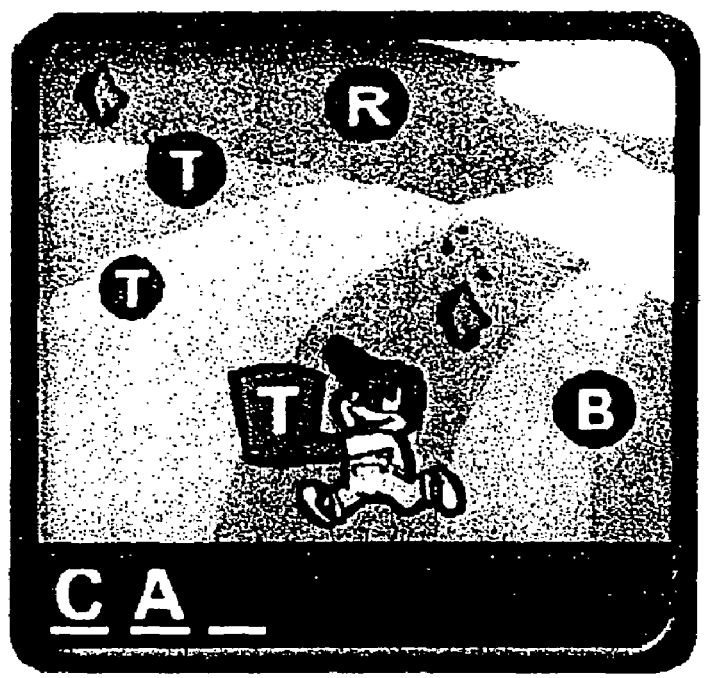

FIG. 12*e* shows a screenshot of a game called "Catcher Fields™", which uses the directional control pad 108. In this game, players use the directional control pad 108 to move the frog back and forth across the bottom of the screen. The object of the game is to help a character "Tad" catch the letters that are thrown from a harvester. Players are scored for every correct letter that is caught. Players can learn the letters of the alphabet, what they look like, and what their sounds represent, as well as their order in the alphabet.

In a first skill level, players recognize capital and lowercase letters, identify letters by name and match letters to their sounds. In a second skill level, players distinguish capital from lowercase letters, and distinguish letters from numbers. In a third skill level, players test their knowledge of the order of the alphabet. They also spell one-syllable words of 3 to 5 letters each. Players also recognize letters in words, listen for beginning and ending sounds and isolate sounds in one-syllable words.

Figure 12F:

FIG. 12f shows a program called Musical Meadow™. Players use seeds that they have collected while playing other games to feed the birds and listen to them sing. Depending upon the number of seeds players put into the feeder, different birds will appear. Each combination of birds will sing a different tune. Players can modify sounds that the birds make by tapping on a bird to replace it with another one.

Players are introduced to a variety of musical styles including classical, country, jazz, blues, rock, reggae, Latin, and Cajun. Players are also introduced to the cello, electric guitar, trumpet, harmonica, marimba, accordian, and banjo.

As illustrated by the programs described with reference to FIGS. 12a to 12f, the apparatus 100 is designed so that many different types of educational programs can be used. Programs for pure educational gameplay and/or creativity can be used. Moving videos and electronic books can also be used with the apparatus 100.

It should be understood that the present invention as described above can be implemented using software, hardware, or a combination of both, in the form of control logic. Based on the disclosure and teachings provided herein, a person of ordinary skill in the art will know of the appropriate ways and/or methods to implement the present invention.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

While the foregoing is directed to certain embodiments of the present invention, other and further embodiments of the invention may be devised without departing from the basic scope of the invention. Such alternative embodiments are intended to be included within the scope of the present invention. Moreover, the features of one or more embodiments of the invention may be combined with one or more features of other embodiments of the invention without departing from the scope of the invention.

Different programs may be obtained from other stand alone memory devices such as data cartridges. In other embodiments, it is possible to download new programs from a server computer via a communication medium such as the Internet. A data cartridge comprising an EEPROM may be used for this purpose.

All publications and patent documents cited in this application are incorporated by reference in their entirety for all purposes to the same extent as if each individual publication or patent document were so individually denoted. By their citation of various references in this document, Applicants do not admit that any particular reference is "prior art" to their invention.

What is claimed is:

1. An interactive, handheld apparatus comprising:
   a housing;
   a display screen on the housing, the display screen configured to display a plurality of images;
   an electronic position location system, wherein the electronic position location system includes a processor that is capable of determining a location of a selected region of the display screen;
   a stylus for selecting one or more of the plurality of images on the display screen;
   a directional control pad on the housing; and
   a memory device adapted to store code for a first educational program and code for a second educational program, wherein the first educational program uses the directional control pad and wherein the second educational program uses the stylus and the electronic position location system,
   wherein the memory device is further adapted to store code for a video program, and
   wherein a user is capable of passively viewing the video program without interacting with the interactive, handheld apparatus.

2. The apparatus of claim 1 wherein the memory device is in the form of a data cartridge.

3. The apparatus of claim 1 wherein the stylus is coupled to the housing with a cord.

4. The apparatus of claim 1 wherein the second educational program comprises a painting program.

5. The apparatus of claim 1 wherein the first educational program comprise a spelling game, a memory game, a number recognition game, or a musical game.

6. The apparatus of claim 1 further comprising a speaker operatively coupled to the processor.

7. The apparatus of claim 1 wherein the first program and the second program are suitable for use by a child less than about 8 years of age.

8. The apparatus of claim 1 wherein the directional pad is on a left side of the display screen and wherein at least one input button is at a right side of the display screen.

9. The apparatus of claim 1 wherein the memory device is in the form of an internal memory chip.

10. The apparatus of claim 1 wherein the housing has an ergonomic shape.

11. The apparatus of claim 1 wherein the memory device is adapted to store a child's interactive history with the apparatus.

12. A method of using the apparatus of claim 1 comprising:
   obtaining the apparatus;
   interacting with the apparatus using the directional control pad;
   interacting with the apparatus using the stylus; and
   passively viewing the video program being displayed on the display screen.

13. A computer readable medium adapted for use with an interactive, handheld apparatus comprising a housing, a display screen on the housing, the display screen configured to display a plurality of images, an electronic position location system, wherein the electronic position location system includes a processor that is capable of determining a location of a selected region of the display screen, a stylus for selecting one or more of the plurality of images on the display screen, a directional control pad on the housing, and wherein the interactive, handheld apparatus is adapted to use a first educational program and is adapted to use a second educational program, wherein the first educational program uses the directional control pad and wherein the second educational program uses the stylus and the electronic position location system.

14. The computer readable medium of claim 13 wherein the computer readable medium is in the form of a data cartridge.

15. The computer readable medium of claim 13 wherein the computer readable medium is in the form of a memory stick.

16. The computer readable medium of claim 13 wherein the computer readable medium has a storage capacity greater than about 2 MB.

17. The computer readable medium of claim 13 wherein the first educational program comprises a game that uses the directional control pad.

18. The computer readable medium of claim 13 wherein the second educational program comprises a painting program.

19. The computer readable medium of claim 13 wherein the first and second educational programs are stored as computer code on the computer readable medium.

20. The computer readable medium of claim 13 wherein the first educational program is stored as computer code on the computer readable medium.

* * * * *